Dec. 20, 1938.  D. C. BETTISON  2,140,826
VALVE ACTUATING MEANS
Filed Sept. 22, 1937
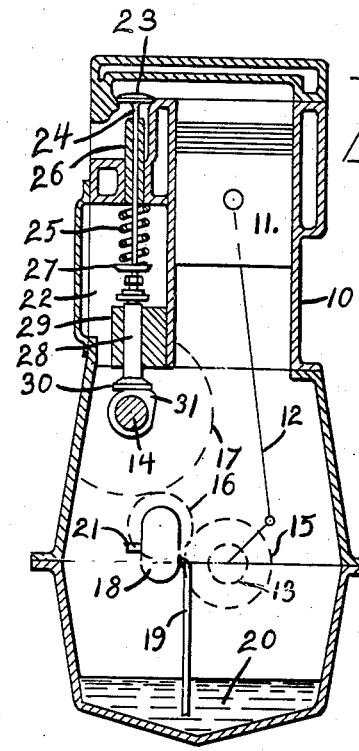
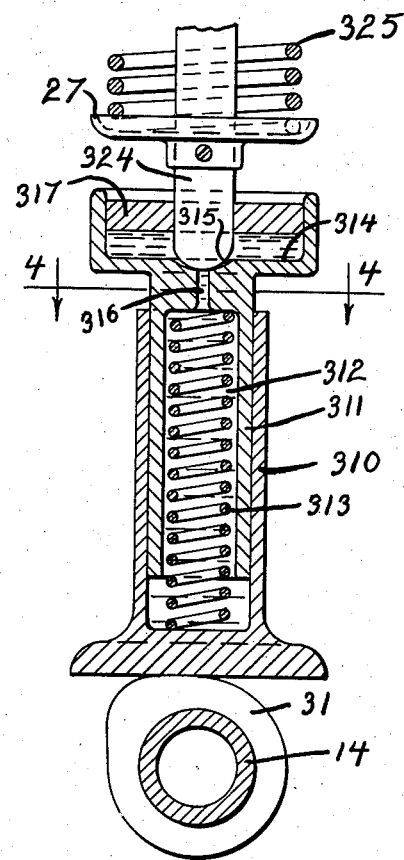
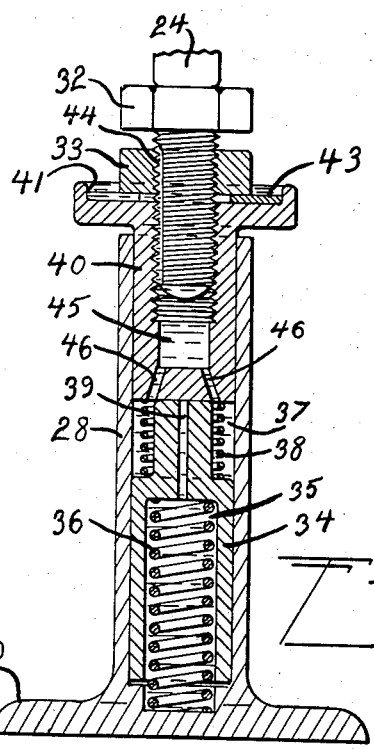
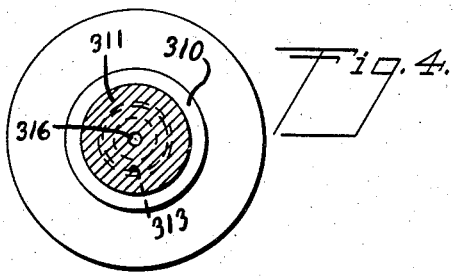
INVENTOR.
D. C. BETTISON.
BY John C. Baisch
ATTORNEYS.

Patented Dec. 20, 1938

2,140,826

UNITED STATES PATENT OFFICE 2,140,826

VALVE-ACTUATING MEANS

David C. Bettison, Omaha, Nebr.

Application September 22, 1937, Serial No. 165,139

3 Claims. (Cl. 123—90)

My invention relates to means for actuating valves, particularly valves of the poppet type, such as are used for the more common forms of internal combustion engines, and wherein the relation of the valves to their cams, or primary actuating members, is subject to variations by thermal expansion and contraction of the valve-stems, push-rods or tappets, engine-cylinders, and other parts with which the valves are associated.

It is customary in the construction of internal combustion engines to provide, in the connecting means between the valves and the cams by which the same are actuated, suitable gaps or clearance spaces of such extent as to accommodate the usual thermal variations in the length of the parts, whereby seating of the valves is assured under all conditions of operation, and expansion or lengthening of the members intermediate a valve and its cam will result merely in shortening the gap or clearance, without causing the valve to be held off its seat at times when it should be fully closed. In automotive engines of the types now in general use, the minimum clearance provided in the valve-lifting means ranges from four-thousandths to fifteen-thousandths of an inch, measured at a time when the engine is considered to be at a normal operating temperature, and frequent re-adjustment of the valve-lifters is necessary for maintaining of proper clearance, as too little clearance may result in preventing seating of a valve, while excessive clearance causes noisy operation and impairs the efficiency of the engine by reducing lift of the valve, starting opening of the valve later in the cycle, and completing closing of the valve earlier in the cycle than when the operation is normal. Lack of uniformity of clearance in the adjustments of the several valves of an engine causes uneven running and excessive valve-noise, while the sounds caused by the operation when the valve clearances are adjusted to uniformity have been deemed heretofore unavoidable.

It is the object of my invention to provide, for valves of the described class, actuating devices having means for automatically compensating for variations in the relation of a valve and its cam or primary actuating member, whereby to assure efficient operation and uniform running of an engine at all times, to avoid the necessity for frequent re-adjustment of the valve-actuating members, and to substantially eliminate the noise which ordinarily results from the existence of clearance-spaces in the valve-actuating connections. My invention provides an intermediary of variable length interposed between a valve and its primary actuating member, or cam, said intermediary having means tending constantly to expand or increase the effective length thereof, but with a force less than enough to effect lifting or unseating of the valve, and said intermediary being subject to a limited reduction of its effective length during each valve-opertaing operation of the cam or primary actuating member.

In the accompanying drawing:

Figure 1 is a diagrammatic view, showing means embodying my invention, applied to an L-head automotive type internal combustion engine;

Figure 2 is a detailed vertical section of a liquid-pressure-controlled expansible intermediary embodying my invention and adapted for use in engines of which the valve-actuating means is lubricated by splash from the crank-case;

Figure 3 is a similar view of a modified embodiment of my liquid-pressure-controlled expansible intermediary; and Figure 4 is a horizontal section of same taken on line 4—4 of Figure 3.

Referring to the drawing, there is represented in Figure 1 positions of an internal combustion engine of conventional automotive type, having an L-head cylinder 10, piston 11, connecting-rod 12, crank-shaft 13, cam-shaft 14, gearing 15, 16 and 17 forming a driving connection between the crank-shaft and cam-shaft, an oil-pump 18 also driven from said gearing and having an intake or suction pipe 19 extending into an oil-sump 20, and a delivery-pipe 21 extending from the oil-pump to various parts of the engine and may carry oil into tappet-chamber 22 and discharge same onto the tappet or valve-lifter should it be desired to provide oil thereto instead of by splash from the crank-case. It is preferred, however, to supply oil to the tappet or valve-lifter by splash from the crank case.

The valve 23 opens into the valve-chamber of the L-head cylinder, the valve-stem 24 extending parallel with the cylinder and its axis intersecting the axis of the cam-shaft. The valve is held normally in closed position by a spring 25 disposed about the lower portion of the valve-stem, between the guide 26 for said stem and a spring-cup 27 attached to the lower portion of the stem. The stem 28 of the valve-lifter or tappet is slidable vertically in the guide 29, the foot 30 of the tappet resting normally upon the cam 31, and in the usual construction of engines of this class the upper end of the tappet carriers an adjusting screw 32 and locknut 33, as a means for adjusting and maintaining the clearance-space between the tappet and the lower end of the valve-stem. In my improved valve-actuating means for engines of this class, the tappet is employed as the expansible intermediary, for continuously and automatically compensating for variations in the relation of the valve and cam, and various forms of said expansible intermediary are described in detail hereinafter.

Referring to Figure 2, there is shown an expansible intermediary or tappet structure suitable for use in an engine wherein tappets are lubricated by splash from the crank-case. In said structure, the tappet-stem 28 is hollow or bored cylindrically from its upper end, and within the lower portion of the bore of said stem there is slidably disposed a plunger 34. The lower portion of said plunger is tubular and open at the bottom, so that the space therein forms a continuation of the chamber 35 in the lower part of the stem 28, and within said chamber is disposed a coil spring 36 of which the pressure is exerted upwardly upon the plunger, thus tending to raise the latter and enlarge the chamber. The upper portion of the plunger 34 is of reduced diameter, so that a chamber 37 is formed about the reduced neck-portion, and within said chamber is disposed a coil spring 38 of which the expansive force is much less than that of the spring 36. A small central passage or port 39 extends from the chamber 35 through the reduced neck-portion of the plunger, and opens to the flat upper end-face thereof. Above the plunger 34 a second plunger or piston-like member 40 fits slidably within the bore of the stem 28, the lower end of said member 40 being engaged by and receiving upward pressure from the spring 38. The upper end of said member 40 has an integral flange, of which the upper side is recessed to form a shallow cup 41, and at the center thereof is a threaded opening for receiving the adjusting screw 32, which is adapted to contact with the valve-stem 24 in the usual way, and locknut 33 on said adjusting screw holds same in adjusted positions.

In the cup 41 beneath the locknut 33 is a slotted washer 43 of which the central opening is larger than the body of the screw 32, and its outside diameter is such that it is within and is centered by the rim of the cup 41. The threaded body of the screw 32 has a longitudinal groove 44 formed therein, so that in any position of said screw a portion of said groove communicates with the central opening of the washer 43 beneath the locknut 33. The slot of the washer, extending radially from the central opening, provides a channel connecting said opening with the space within the rim of the cup 41 around the locknut 33, so that oil, collected in said cup by splashing from the crankcase of the engine, may flow through the slot to the central opening of the washer, and thence through the groove 44 of the adjusting-screw 32 to a cavity or chamber 45 in the member 40 beneath said screw. From the chamber 45, ports 46 extend to the chamber 37 about the neck-portion of the plunger 34.

With this type of tappet-structure, the screw 32 is adjusted to provide the usual clearance between the same and the valve stem 24, when the plunger 34 is seated at the bottom of the bore of the stem 28, and the member 40 is engaged with the upper end of said plunger 34, the relations of the parts being then such that the tappet is operable as if the member 40 were integral with the tappet-stem 28.

Under normal operating conditions chamber 35 is filled with oil as well as the passage or port 39 and said passage is closed by the lower end of the plunger 40. The chamber 37 is also filled with oil which is led thereto from the cup 41 through the groove 44, chamber 45 and ports 46.

In the operation of the structure, however, the expansion of the spring 38 will first lift the member 40 until the screw 32 is engaged with the valve stem 24, oil from the cup 41 being drawn down through the groove 44, chamber 45 and ports 46 into the chamber 37. Such lifting of the member 40 opens the upper end of the port 39 through the neck-portion of the plunger 34, and expansion of the spring 36 lifts said plunger, oil from the chamber 37 being drawn through the port 39 into the chamber 35 until the upper end of the plunger is again seated against the lower end of the member 40 to close said port. Upon operation of the cam to lift the tappet-structure and open the valve 23, the pressure from the cam is transmitted through the body of oil in the chamber 35, to the plunger 34, and from the latter through the member 40 to the screw 32, the member 40 acting as a valve to close the port 39 and prevent escape through said port of the oil from the chamber 35. The increased pressure upon the oil in said chamber causes, however, a slight leakage about the plunger from the chamber 35 to the chamber 37, in which the oil is constantly at or below atmospheric pressure. Thus a minute shortening or reduction in the effective length of the tappet-structure will occur during each valve-opening operation, and at the conclusion of said operation a minute clearance will exist momentarily between the screw 32 and the end of the valve stem 24, such clearance being immediately taken up by re-expansion of the tappet-structure.

Any expansion of the spring 36 must lengthen the chamber 35 and such lengthening of the chamber 35 would tend to create a vacuum therein and to draw oil into said chamber 35 from the chamber 37 through the passage 39, provided said passage were not closed by the lower end of the plunger 40. As said passage 39 is normally closed by the plunger 40 oil cannot pass into the chamber 35 and the lengthening of the chamber 35 is therefore prevented until oil is permitted to enter through said passage 39 by the separation of the plunger 34 and the plunger 40.

In the operation of the structure, whenever any clearance or slack occurs, as hereinbefore described, between the head of the adjusting-screw 32 and the valve-stem 24 the spring 38 will expand and separate plunger 34 and plunger 40 enough to permit oil to be drawn into chamber 35 through passage 39 from chamber 37, thus permitting spring 36 to expand and lengthen the chamber 35 until the end of plunger 34 abuts against the lower end of plunger 40 thereby closing the passage 39 which stops the flow of oil from chamber 37 into passage 39 and thus prevents further lengthening of the chamber 35.

As the horizontal sectional area of the passage 39 is relatively small as compared with the horizontal sectional area of the chamber 35 the suctional force is reduced at the upper end of said passage in proportion to the difference in the above mentioned horizontal sectional areas. Therefore the relatively weak spring 38 will overcome the suctional pressure at the upper end of passage 39 created by the expansion pressure of spring 36 in chamber 35; said spring 38 will therefore separate the plungers 34 and 40 thereby opening said passage and permitting the lengthening of spring 36 by admitting oil into chamber 35 through passage 39 until the valve clearance is taken up and the adjacent ends of the plungers 34 and 40 again abut against each other closing passage 39.

Referring to Figure 3 there is shown a modified form of my expansible intermediary or tappet-structure, also suitable for use in an engine wherein the tappets are lubricated by splash from the crank-case. In said structure the tappet-stem 310 is hollow or bored cylindrically from its upper end, and within the bore of said stem there is slidably disposed a plunger 311. The lower portion of said plunger is tubular and open at the bottom, so that the space therein forms a continuation of chamber 312 in the lower part of the stem 310, and within the chamber is disposed a coiled spring 313 of which the pressure is exerted upwardly upon the plunger, thus tending to raise the latter and enlarge the chamber. The upper end of said plunger 311 has an integral flange, of which the uper side is recessed to form a cup 314 of considerable depth and having a central concave recess 315 in the bottom from which a port 316 communicates with chamber 312. The lower end of valve-stem 324 is rounded and extends into the concave recess 315 in the bottom of the cup in such manner that when said rounded end abuts against the bottom of the concave recess port 316 is closed. A felt washer 317 is provided in the cup 314, preferably spaced upwardly from the bottom thereof, to prevent oil in said cup from splashing therefrom during operation of the engine.

Oil is collected in the cup 314 by splashing from the crank-case of the engine and upon separation of the plunger and the valve-stem passes into chamber 312. In the operation of the structure the expansion of the spring 313 will cause the plunger 311 to abut against the lower end of valve-stem 324 thereby closing passage or port 316, said spring having insufficient strength to overcome the closing pressure of spring 325 of the valve-stem. Upon operation of the cam to lift the tappet-structure and open the valve the pressure from the cam is transmitted through the body of the oil in the chamber 312, to the plunger, and from the latter to valve-stem 324. The increased pressure upon the oil in said chamber causes, however, a slight leakage about the plunger from the chamber 312. Thus a minute shortening or reduction in the effective length of the tappet-structure will occur during each valve-opening operation, and at the conclusion of said operation a minute clearance will exist momentarily between the plunger 311 and the valve-stem 324, said clearance being immediately taken up by re-expansion of the tappet-structure but during the time the clearance exists additional oil will be drawn into the chamber 312 from the cup 314 through port 316, said oil will be drawn into the chamber 312 until the lower end of the valve-stem 324 again closes port 316. The cup 314 is of sufficient capacity to maintain a reserve of oil for replenishing the chamber 312 to compensate for oil leakage from said chamber.

In the various embodiments of my invention it should be noted that each employs, between the actuating cam and the valve, an intermediary of variable effective length, having resilient means tending constantly to increase the effective length thereof, said resilient means exerting a force less than that of the valve-closing spring, whereby expansion of the intermediary is insufficient to cause opening or unseating of the valve from its closed position, and the expansion being thus limited to the taking up of any clearance existing in the actuating connections between the cam and the valve. In each case, also, during the valve-opening operation, a distinct but very slight shortening of the intermediary occurs, so that should there be a change occurring in the relation of the cam and valve tending to reduce the distance between them, the amount of such change which can occur between successive operations will be less than the shortening of the intermediary, and the change of relation of the cam and valve cannot result in the valve being held in an unseated position. Likewise the structure of the expansible intermediary, shown in Figure 2, is such that any failure thereof to function normally, or automatically increase in effective length to take up any existing clearance in the valve-actuating connections, will result merely in allowing a continuation of the usual clearance in said actuating connections, so that operation of the engine may occur as if the itermediary were of ordinary non-expansible construction.

The same features for ensuring continued operation of the engine may also be effected with the structure shown in Figure 3 by providing the respective parts in suitable lengths.

The shortening of the intermediary is controlled by the rate of escape of oil from a pressure-chamber wherein the liquid is subject to increased pressure during the valve-opening operation, so that a slight leakage from said chamber is induced, and the leakage from said chamber is replenished during the periods between successive valve-opening operations of the mechanism, and the valve-opening pressure transmitted through the intermediary is caused to effect a positive seating of the valve device by which escape of oil from the pressure-chamber, through the supply-passage thereto, is prevented.

It is thought that the invention and many of its attendant advantages will be understood from the foregoing description and it will be apparent that various changes may be made in the form, construction, and arrangement of the parts without departing from the spirit and scope of the invention or sacrificing all of its material advantages.

Having thus described my invention what I claim is:

1. A valve-actuating intermediary for use in internal combustion engines wherein a spring-closed valve is openable by pressure transmitted from a cam through an intermediary, comprising a member having a cylindrical bore closed at one end and open at the other, a second member fitting slidably in said bore and extending from the open end thereof, a plunger fitting slidably in said bore between the closed end thereof and said second member; there being an intermediate chamber between said second member and said plunger, a pressure chamber between said plunger and the closed end of said bore and a port extending through said plunger connecting said chambers, yielding means for urging the plunger outwardly of the bored member to cause engagement thereof with the inner end of the second member to close said port, and resilient means tending to disengage said second member from said plunger, the relation of said elements being such that valve-opening pressure is transmitted from said first member through the liquid in said pressure chamber to said plunger and thence to said second member, said pressure being adapted to cause the plunger and second member to positively engage to close said port during the transmission of said valve-opening pressure through the intermediary.

2. A structure as set forth in claim 1, including a collecting cup carried by said second member having a passage communicating with the interior of said cup and intermediate chamber through said second member.

3. An intermediary for use in internal combustion engines for transmitting valve-opening motion from a cam to a spring-closed valve, comprising an intermediate member and two terminal members, said members being adapted to contact serially for positive transmission of longitudinal pressure, one of the terminal members being partially bored longitudinally and inclosing the intermediate member and providing a pressure-chamber between said terminal member and intermediate member, said intermediate member being slidable in the bore, said bore also slidably receiving a portion of the other terminal member and providing a supply chamber between the latter terminal member and the intermediate member, there being a passage through said other terminal member communicating with the supply chamber, and a passage through the intermediate member for connecting the supply chamber with the pressure-chamber, the latter passage being closable by seating of the intermediate member against the terminal member adjoining said supply chamber; resilient means in said supply chamber tending to move the terminal member away from said intermediate member to open said passage, and resilient means in the pressure-chamber engaging the intermediate member and opposing and having greater force than that of the resilient means in the supply chamber whereby to hold the intermediate member normally in seated position against said terminal member.

DAVID C. BETTISON.